Nov. 21, 1967 K. GUDDAL 3,353,322
METHOD OF MAKING A WALL STRUCTURE
Filed Aug. 27, 1963 5 Sheets-Sheet 1
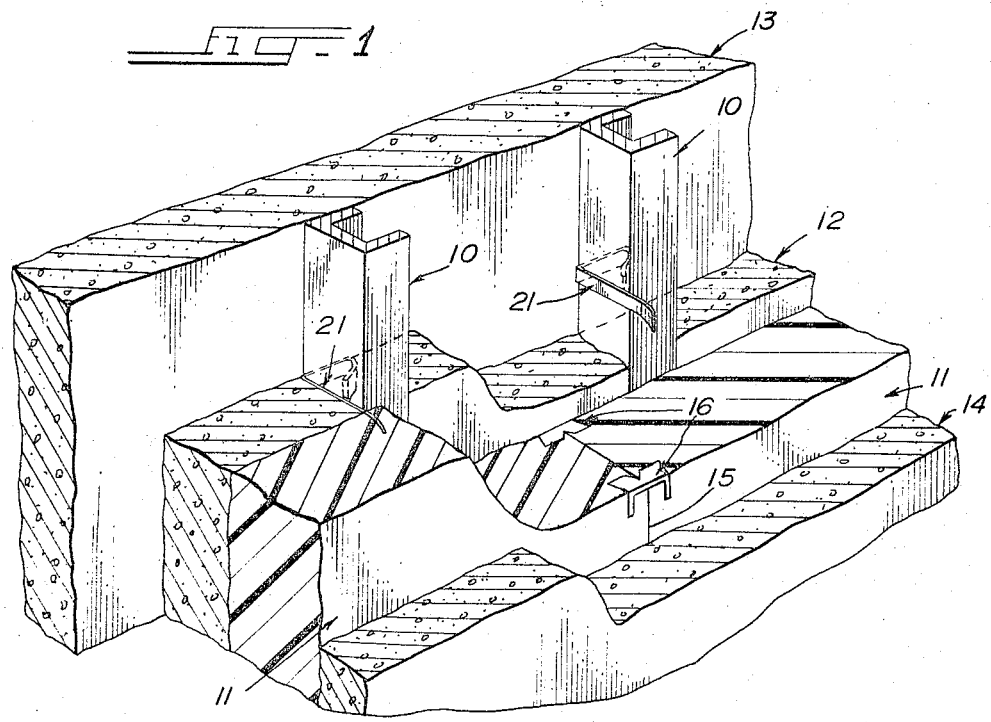
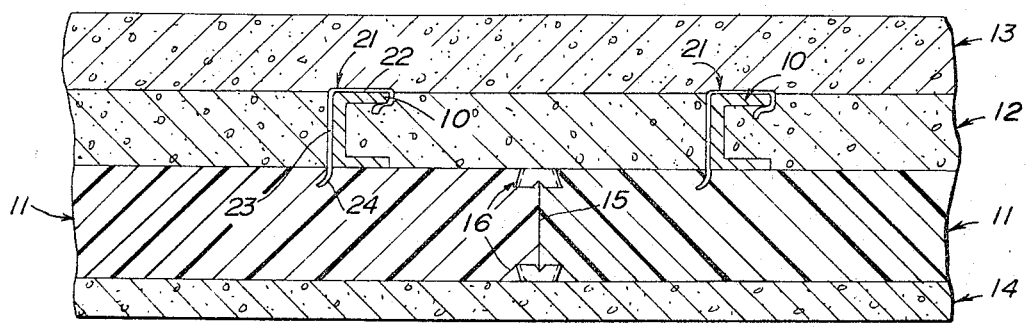
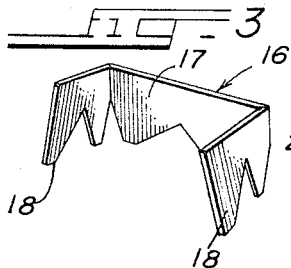 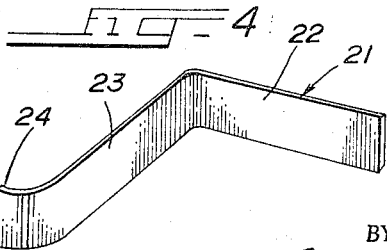
INVENTOR.
KARL GUDDAL
BY
Mazall, Johnston, Cooke & Root
Attys.

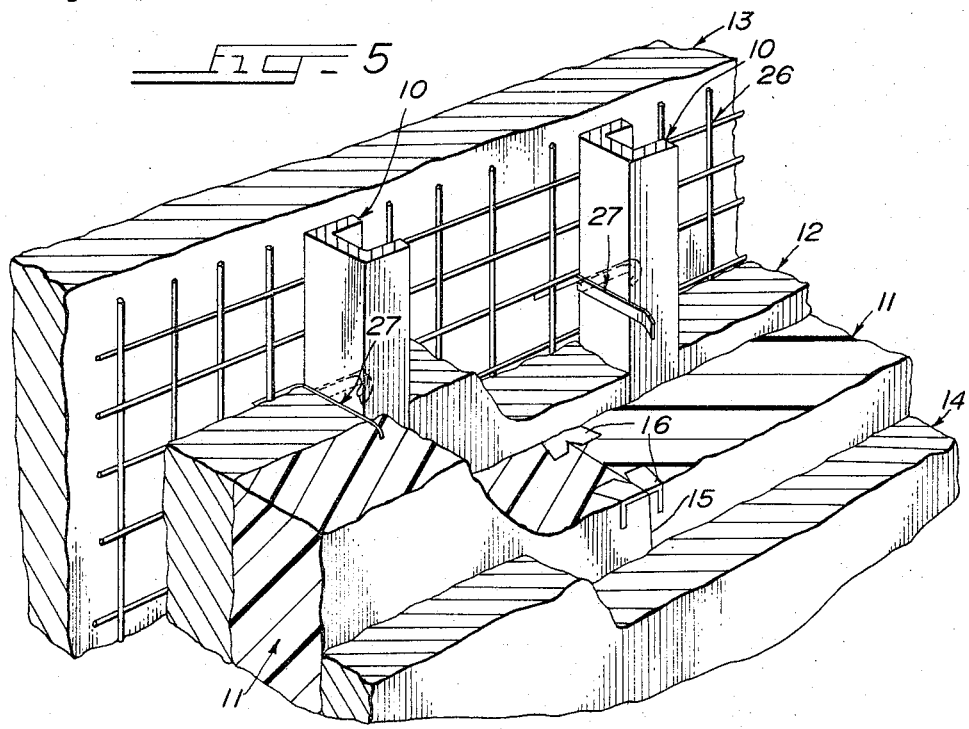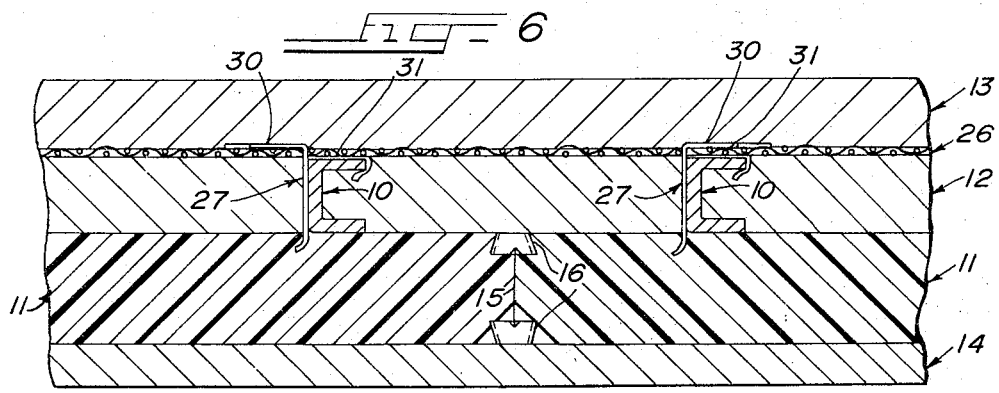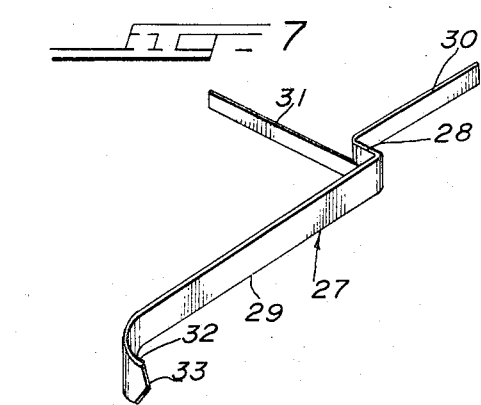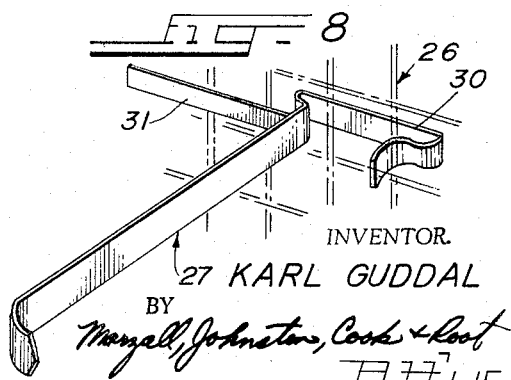
INVENTOR.
KARL GUDDAL

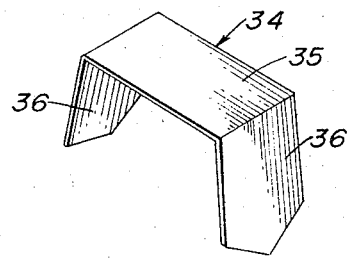
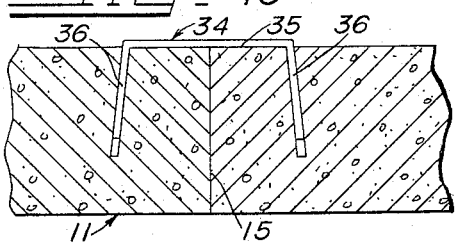
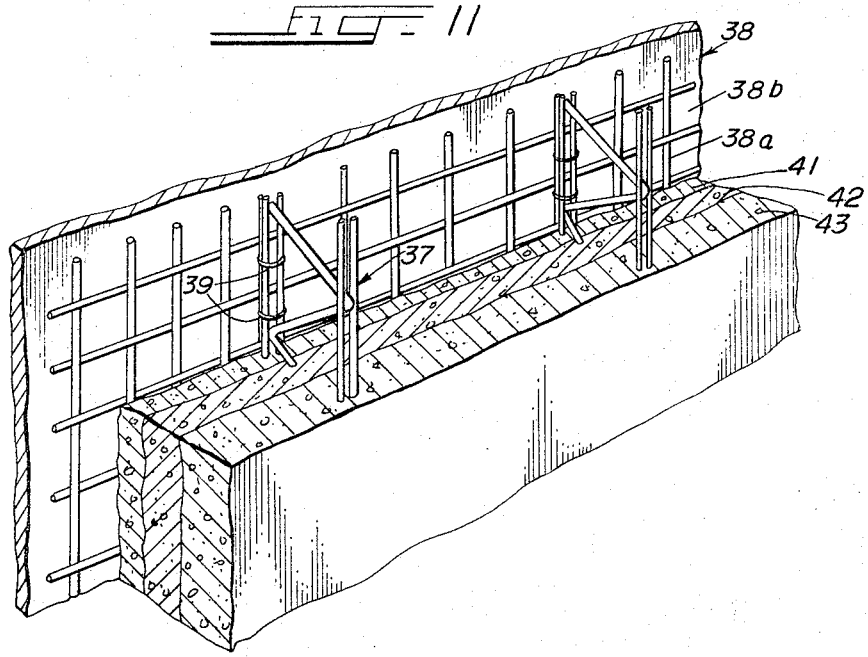
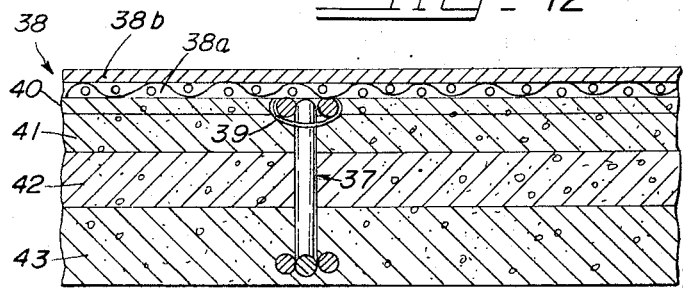

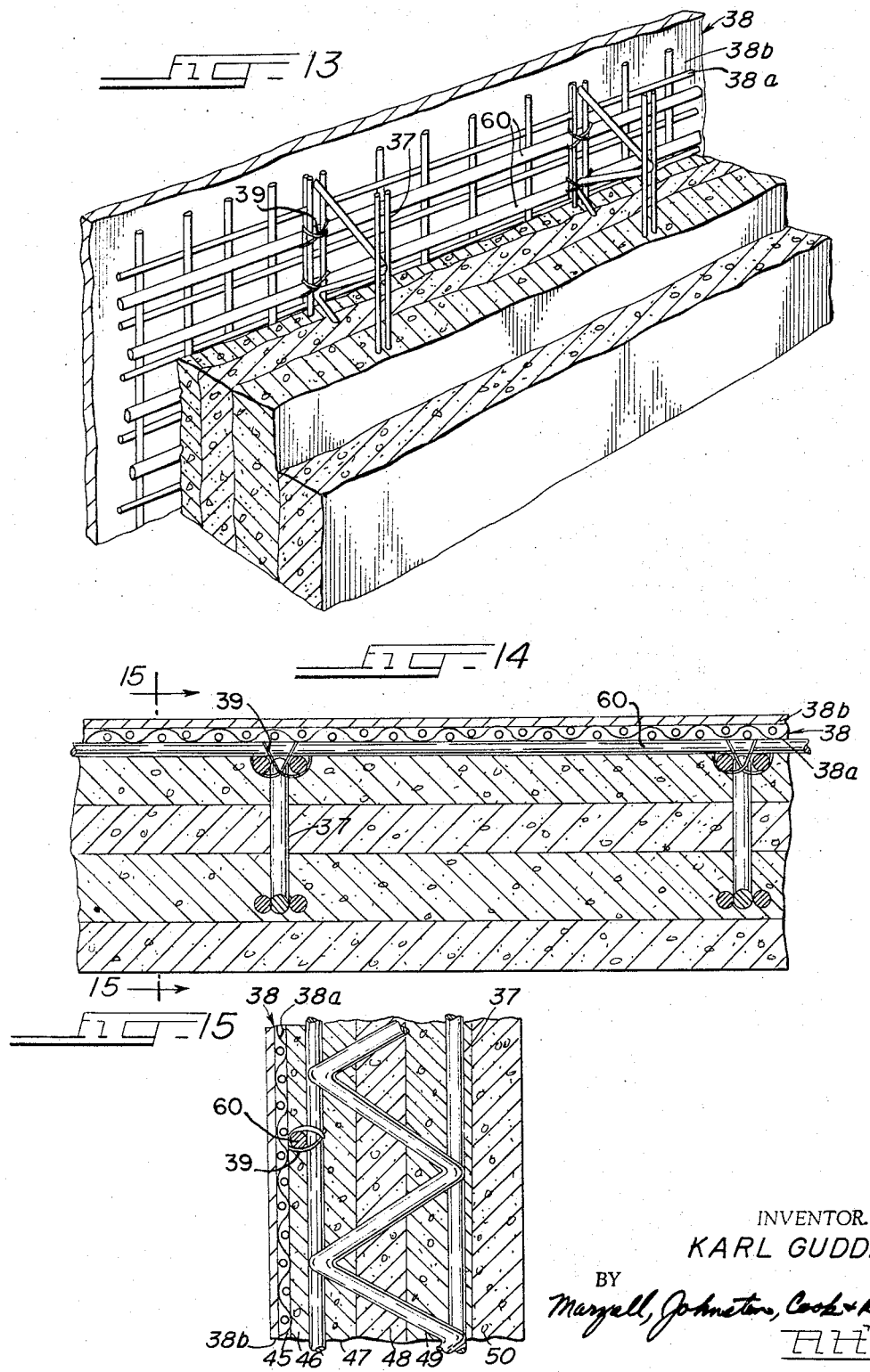

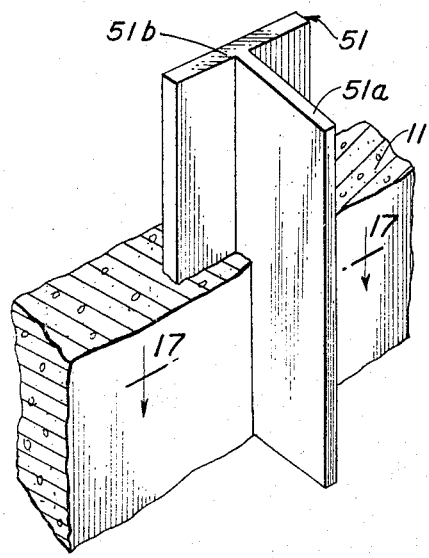
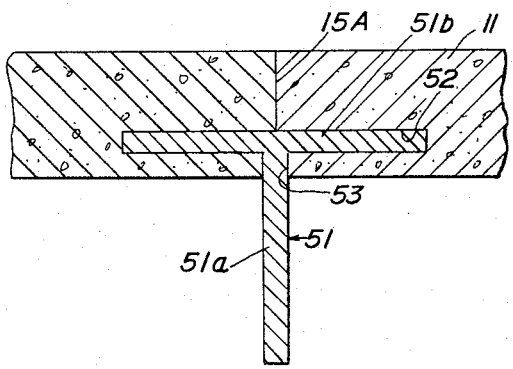
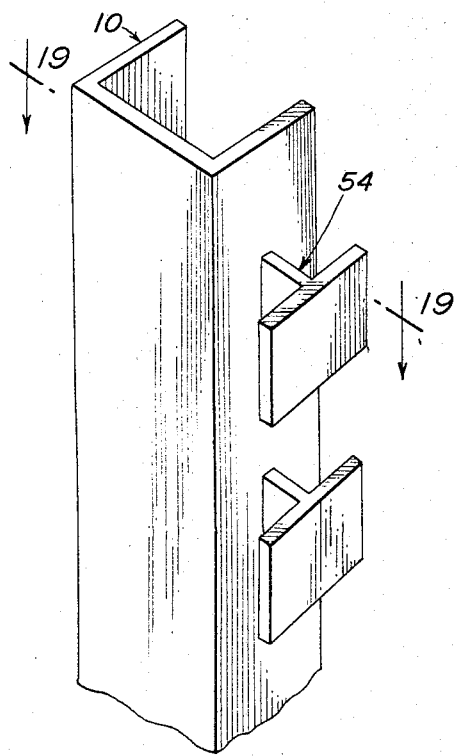
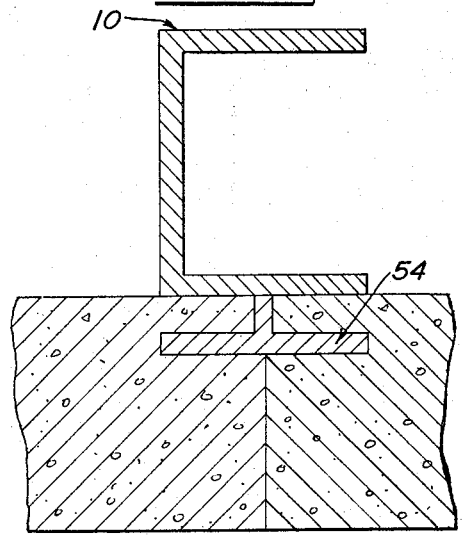

United States Patent Office 3,353,322
Patented Nov. 21, 1967

3,353,322
METHOD OF MAKING A WALL STRUCTURE
Karl Guddal, Peger Road, Fairbanks, Alaska 99701
Filed Aug. 27, 1963, Ser. No. 304,809
3 Claims. (Cl. 52—744)

This invention relates in general to a wall construction for a building or the like, and more particularly to a wall construction that is self-supporting and that provides a continuous thermal and/or sound barrier useful in residential, commercial, industrial, public and other types of buildings and structures, although other uses and purposes may be apparent to one skilled in the art.

The wall structure of the present invention includes sheets of rigid insulating material arranged in abutting relationship and secured along one side of a series of upstanding structural members. Clips or other means are provided to tightly join the abutting edges of the insulation thereby defining a tight sealed joint and effectively a continuous layer of insulation. Clips or other means are provided for securing the sheets of insulation to the structural members to facilitate erection of the wall structure. A layer of mortar or concrete is placed over the outer surface of the insulation of a thickness approximately equal to the depth of the structural members, and thereafter a finish material of any suitable type is laid over the mortar. Any suitable finish material is then applied over the inner surface of the insulation to complete the wall structure. A modification includes providing metal lath between the layer of mortar and the exterior finish material in order to enhance the overall strength of the wall structure. Any type of studs may be used to define with the other elements a load-bearing or non-load bearing wall.

The clips or other means employed for joining the abutting edges of the sheets of insulation are such as to assure a tight joint and to facilitate construction of the wall structure. Likewise, the clips or other means which secure the sheets of insulation to the structural members are such as to facilitate wall construction and also to provide a desired assemblage of the structural members and sheets of insulation. Other clips or means are provided which are employed to secure the insulation to the structural members when the metal lath is employed between the structural members and the finish material. These clips also enable securing of the metal lath to the structural members to application of the finish material thereover.

Accordingly, it is an object of the present invention to provide an improved wall structure that defines a continuous thermal and/or sound barrier while embracing structural integrity.

Another object of this invention is to provide a self-supporting wall structure that includes a continuous thermal and/or sound barrier.

Another object of the present invention is in the provision of a wall structure that provides a continuous thermal and/or sound barrier and which may be erected without the normal requirement of a building structural frame such as reinforced concrete, steel or wood and therefore result in saving time and cost.

Still another object of the present invention is to provide a wall structure capable of defining a continuous thermal and/or sound barrier, wherein various interior and exterior material finishes may be applied depending upon the requirements of the installation.

A further object of the present invention is to provide a wall structure that defines a continuous thermal and/or sound barrier which is homogenous and can be varied to meet all thermal and sound requirements to assure uniformity of performance over the entire wall surface.

A still further object of the present invention is to provide a wall structure that defines a continuous thermal and/or sound barrier, wherein a continuous layer of insulation is employed that may be quickly and easily secured together and to the structural supporting system.

Another object of this invention is to provide an improved method of making a wall structure having a continuous thermal and/or sound barrier.

Still another object of this invention is in the provision of a wall structure that may be built as a reinforced concrete wall without the use of forms.

A further object of this invention resides in the provision of a method of making a steel, reinforced concrete wall without use of the usual forms.

A still further object of this invention is to provide a method of making a steel reinforced concrete wall including the erection of a plurality of truss steel studs, applying a backing member to one side of the studs, and spraying a plurality of layers of concrete against the backing member to a depth equal at least to the depth of the studs.

A still further object of the present invention is to provide a wall structure having a continuous layer of insulation to provide a continuous thermal barrier and to eliminate the necessity of driving nails or other fasteners through the insulation since such nails would provide a frost path in extremely cold weather.

Other objects, features and advantages of the invention will be apparent from the following detailed disclosure, taken in conjunction with the accompanying sheets of drawings, wherein like reference numerals refer to like parts, in which:

FIG. 1 is a perspective view of a wall structure shown in the process of construction and in accordance with the present invention;

FIG. 2 is a horizontal sectional view taken through the wall structure of FIG. 1;

FIG. 3 is a perspective view of a clip employed for joining abutting edges of sheets of insulating material;

FIG. 4 is a perspective view of a clip employed in the present invention for securing the sheets of insulating material to the structural members;

FIG. 5 is a perspective view of a modified form of the present invention showing the wall being constructed with certain parts broken away for purposes of clarity;

FIG. 6 is a horizontal sectional view taken through the modified wall structure of FIG. 5;

FIG. 7 is a perspective view of the clip employed in the embodiment of FIGS. 5 and 6 for securing the sheets of insulation and the metal lath to the structural members;

FIG. 8 is a view similar to FIG. 7 illustrating the manner of securing the metal lath by employing the clip;

FIG. 9 is a perspective view of another form of clip employed for connecting adjacent sheets of insulating material together;

FIG. 10 is a detail transverse sectional view taken through a part of a pair of abutting sheets of insulating material and showing the clip of FIG. 9 employed to connect the sheets;

FIG. 11 is a perspective view of another form of the invention illustrating the construction of a steel reinforced concrete wall;

FIG. 12 is a horizontal sectional view taken through the embodiment of FIG. 11;

FIG. 13 is a modification of the embodiment of FIGS. 11 and 12, wherein the studs are spaced from the backing member;

FIG. 14 is a horizontal sertional view through the embodiment of FIG. 13;

FIG. 15 is a fragmentary detailed sectional view taken substantially along line 15—15 of FIG. 14;

FIG. 16 is a perspective view of a modified structure for connecting adjacent sheets of insulating material to upright studs;

FIG. 17 is a sectional view taken substantially along line 17—17 of FIG. 16;

FIG. 18 is a perspective view of another form of stud employing T-shaped clips for securing adjacent sheets of insulating material thereto; and FIG. 19 is a transverse sectional view of the stud of FIG. 18 and taken substantially along line 19—19 of FIG. 18.

Referring now to the drawings and particularly to FIGS. 1 and 2, one embodiment of the invention is illustrated wherein a wall structure includes generally a plurality of upstanding structural members or studs 10, a plurality of sheets of rigid insulation material 11 arranged in abutting end-to-end relation and along one side of the studs 10, a layer of mortar or concrete 12 arranged along the exterior side of the sheets of insulating material 11, a layer of finish material 13 over the outer face of the mortar layer 12, and a layer of finish material 14 along the inner surface of the sheets of insulating material 11. The finish material 13 may be the exterior or interior, and likewise, the finish material 14 may be the exterior or interior. Thus either side of the wall structure may be the inside or outside.

The studs 10, while shown as channel-shaped steel members, may be of this type, wood or any other suitable material. These studs are first erected in generally vertical coplanar position and spaced in parallel relationship at equal distances apart. These studs may be of any size or geometrical configuration, depending upon the requirements of the wall structure. For example, a steel channel-shaped stud like that shown in the drawing may have a depth of ¾-inch and such a wall would be substantially non-load bearing. If the wall is to be load bearing, a trusssteel stud and concrete in place of mortar, such as that shown in FIGS. 11–15, may be employed.

The sheets of rigid insulation 11 may be of any suitable rigid material, such as expanded polystyrene, foamed polyurethane, rigid wood fiberboards, rigid mineral fiberboards, foamglass or the like, and may be of a thickness desired to achieve the necessary thermal and/or sound barrier qualities. Further, the sheet size may vary depending upon the type of material used for the particular installation. Alternatively, the insulation may be of a type that can be sprayed on in liquid form to thereafter rigidify and define a rigid layer of insulation. The abutting adges form joints, such as the joint 15, and a plurality of clips 16 or other means are provided along the joints and at each surface of the sheets for connecting the sheets together and effectively forming a continuous sheet of insulation. Where the joint between adjacent sheets is along the vertical as shown in FIG. 1, a plurality of clips 16 may be employed up and down the joint to interconnect the adjacent sheets 11 together.

Referring now particularly to FIG. 3, each clip 16 includes a generally U-shaped body having a flat bight portion 17 and opposed leg portions 18. The lower edge 19 of each leg portion is serrated or prepared so as to facilitate driving the clip into the adjacent sheets of insulating material 11. Moreover, the leg portions 18 diverge to cam the adjacent sheets of insulation tightly together when the clips are driven thereinto, thereby providing a tight seal at the joints and effectively a continuous layer of insulation. As seen in FIGS. 1 and 2, the bight portion 17 of each clip 16 straddles the joint 15 but is embedded in the sheets of insulating material. It should be appreciated that the clip 16 is unique in facilitating the ease of construction of the wall structure and to facilitate the connecting of the sheets of insulating material, but other clips may also be employed with the wall structure of the present invention.

Another form of clip is shown in FIGS. 9 and 10 and generally designated by the numeral 34. This clip is also generally U-shaped, but formed and used like the ordinary staple. A bight portion 35 has extending from opposite ends legs 36 that are pointed at their free ends and which engage in the sheets of insulating material as shown in FIG. 10. The bight portion 35 straddles the joint 15 and lays against the outer face of sheets 11. The legs 36 diverge and preferably define an angle of no less than five degrees with a line perpendicular to the bight portion 35 so that the clips when applied will force the abutting edges of the sheets 11 tightly together in sealed relationship.

The connected sheets of insulating material 11 are secured to the studs 10 by clips 21 or other suitable means. A plurality of clips may be provided up and down the studs 10 to properly secure the sheets of insulating material thereto. These clips are unique and easy to handle so that little time need be taken to effect proper securing of the sheets of insulating material to the structural members 10. Each clip 21 is generally L-shaped and includes substantially right-angularly connected leg portions 22 and 23. The leg portions 22 are adapted to engage over the outer surface of the studs 10 and be bent thereover as shown in FIG. 2, while the leg portions 23 are adapted to engage over a side or end surface of the studs 10. The free end of the clip leg portion 23 is bent to define a laterally extending lug portion 24 which is pointed at 25, and the lug portion is inserted or driven into the sheets of insulating material 11 as particularly shown in FIG. 2 so that the clips 21 properly hold the sheets of insulating material 11 in place against the inner surfaces of the studs 10 during erection of the wall structure. Should the stud 10 have a shape other than rectangular as shown in the drawings, the clip 22 would need to be similarly reshaped in most cases in order to properly function to secure the sheets of insulating material to the studs 10.

While the clips 16 and 21 are preferably constructed of metal, it should be appreciated that they may be constructed of any other suitable material, such as plastic or the like. Moreover, the size of the clips 16 and 21 may vary depending upon the dimensions of the sheets of insulating material and the dimensions and configuration of the studs 10.

It should also be appreciated that other means may be employed to secure the insulating sheets to the studs. For example, tape or staples may be employed.

Following the erection of the studs 10 and sheets of insulating material 11, the interior of the wall structure or the exterior may then be completed at different times or at the same time. The layer of mortar or concrete 12 is applied in any suitable manner over the exterior surface of the sheets of insulating material and around the structural members or studs 10 to a depth substantially equal to the depth of the studs 10. Specifically, the mortar or concrete may be applied by trowel or spraying. Thereafter, the finish material 13 of any desirable type may be applied over the outer surface of the layer of mortar or concrete 12. The finish material 13, if exterior, may be stucco, marblecrete, ceramic tile, prefinished panels of metal or other suitable materials, or any other well known exterior finish material.

Thereafter, the finish material 14 may be applied to the inner surface of the sheets of insulating material 11, and similarly, this material, if interior, may be plaster, plasterboard, wood paneling or any other known interior finish material. However, the exterior finish material may be applied over the layer of mortar or concrete 12 or the exposed surface of the insulation.

Referring now to the embodiment of FIGS. 5 and 6, this embodiment differs only in that metal lath or wire mesh 26 is provided between the studs 10 and the exterior finish material 13 to further strengthen the wall structure. Additionally, the clip holding the sheets of insulating material 11 to the studs 10 is modified to also serve as a connector of the metal lath or wire mesh 26 to the studs 10. This clip is shown in greater detail in FIGS. 7 and 8, and differs from the clip 21 in that the leg portion 28 connected to the leg portion 29 is additionally provided with a third leg portion 30 extending from the leg portion 28 to be foldable over the metal lath or wire mesh 26 as shown in FIGS. 5, 6 and 8. Actually, the leg portion 28 is bifurcated or split to define the leg portion 30 and a leg portion 31 that functions as did the leg portion 22 in the clip 21. Thus the leg portion 31 functions to engage over the outer face of the stud 10, while the leg portion 30 extends through the metal lath or wire mesh 26 and may then be bent over to secure the metal lath to the stud 10 either in a manner shown at the left or right of FIG. 6. Thus, the leg portion 30 may be bent over the metal lath 26 in either direction. Again, the leg 29 is provided at its free end with a laterally extending lug portion 32 pointed at 33 for penetrating the sheets of insulating material 11. Accordingly, the single clip 27 functions to fasten the sheets of insulating material and the metal lath to the studs 10.

Referring now particularly to FIGS. 11 and 12, another embodiment of the invention is shown, wherein a steel reinforced concrete wall may be constructed without the use of concrete forms. By elimination of the use of forms, a tremendous saving may be accomplished while building a concrete wall having essentially the same strength characteristics of a wall that is poured by use of forms.

In a wall construction of this type, a plurality of truss steel studs 37 are erected into upright position and spaced from each other in any suitable manner. This wall is intended to be load bearing and essentially defines a core which may have insulation and/or interior and exterior finish materials applied to either side. For example, the wall structure of FIG. 11 could be incorporated in the wall structure of FIGS. 1 and 2 wherein it would be substituted for the studs 10 and the layer of mortar or concrete 12.

If desired, longitudinally extending rods or reinforcing bars, of steel or other material, as seen in the embodiment of FIGS. 13–15 may be employed with the studs 37 to additionally reinforce the wall structure. A backing member 38 is secured to the studs 37 along one side thereof in order to enable the application of concrete around the studs 37. While this backing member may take any desired form, it is preferably paper-backed metal lath to provide a surface upon which an initial coat of concrete or mortar may adhere to prior to the enveloping of the studs 37 with concrete. Specifically, the backing member 38 as shown includes a layer of wire lath 38a having a layer of paper 38b secured to one side thereof. The metal lath side of the backing member 38 would face the studs 37 and be secured thereto by any suitable means such as the tie wires 39. Initially, a "scratch" coat 40 of mortar or concrete would be applied to the metal lath side of the backing member 38. Thereafter successive layers 41, 42 and 43 of concrete would be applied over the "scratch" coat 40 to completely envelop the studs 37 and thereby define the steel reinforced concrete wall. Application of the "scratch" coat 40 and/or the layers 41, 42 and 43 may be by trowel or by spraying. Preferably, the spraying technique would be followed inasmuch as it would save considerable time.

Thus, a part of the invention includes a method of making a steel reinforced concrete wall as above set forth.

Referring now to FIGS. 13–15, another embodiment is shown which differs from the embodiment of FIGS. 11 and 12 as to a reinforced steel concrete wall only in that the backing member 38 is arranged in spaced relation from the studs 37 by means of longitudinally extending reinforcing bars 60 so that a greater amount of concrete may be applied to more completely embed the studs 37 and enhance the structural strength of the wall. Further the bars 60 add longitudinal rigidity to the wall. In this embodiment, a "scratch" coat 45 is applied to the backing member 38, and thereafter successive layers of concrete 46, 47, 48, 49 and 50 are applied over the "scratch" coat to fully embed the steel studs 37 in concrete, again without employing the use of forms. It should be appreciated that in this embodiment and the embodiment of FIGS. 11 and 12, it may take any number of layers of concrete to embed properly the studs 37, and that the number of layers shown in the drawings is merely illustrative for the application.

Another alternate form of interconnecting the sheets of rigid insulation 11 is illustrated in FIGS. 16 and 17, this embodiment differing from FIGS. 1 and 2 primarily in that the upright structural members or studs 51 are T-shaped in cross section. Each stud 51 includes a leg 51a and a cross arm 51b extending at right angles to the leg. The edges of the sheets of insulating material 11 are vertically slotted at 52 to receive one part of the cross arm 51b, and recessed at 53 to provide for receiving a part of the leg 51a. Therefore, the adjacent sheets of insulating material 11 may be arranged together with the studs 51 and to define a point 15A which is in intimate sealing relationship. In the erection process, a sheet 11 of insulating material will be erected and a stud 51 arranged in place with that sheet of insulating material. Then a second sheet of insulating material will be mounted on the stud 51 and to form a joint 15A with the first sheet of insulating material. Thereafter, another stud 51 is erected and in such a position as to force the last mentioned sheet of insulating material 11 against the first stud 51 and the first sheet of insulating material at the joint 15A. Thus a tight sealing joint 15A will be defined. Thereafter, successive sheets of insulating material and studs will be erected to form the continuous wall which would define a continuous layer of insulating material. Finally, the layer of mortar and finish materials on opposite sides will be added as in FIGS. 1 and 2 to give the complete wall structure.

A modification of the embodiment of FIGS. 16 and 17 is shown in FIGS. 18 and 19, wherein a conventional channel-shaped stud 10 is employed and provided with T-shaped brackets or clips 54 mounted longitudinally along one side thereof to receive the slotted sheets of insulating material as shown in FIGS. 16 and 17. If so desired, the clips or brackets 54 may be arranged relative to the stud 10 so that mounting of the sheets of insulating material thereon will space the surface of the insulating material adjacent to the stud away from the stud, wherein the stud may be completely embedded or enveloped with mortar or concrete during construction of the wall.

It will be understood that modifications and variations may be effected without departing from the scope of the novel concepts of the present invention, but it is understood that this application is to be limited only by the scope of the appended claims.

The invention is hereby claimed as follows:

1. The method of making a reinforced building wall comprising the steps of, erecting a plurality of studs into upright horizontally spaced coplanar relation, securing spacing means to said studs along one side thereof, securing a substantially imperforate backing member to said studs along one side thereof but in spaced relation thereto, and spraying concrete onto said backing member and around said studs until the concrete reaches such a thickness as to completely cover the edges of the studs remotely located from said backing member.

2. The method of making a reinforced building wall comprising the steps of, erecting a plurality of studs into upright horizontally spaced coplanar relation, securing a plurality of vertically spaced horizontally extending reinforcing bars to said studs along one side thereof, securing a substantially imperforate backing member along said reinforcing bars and in spaced relation to said studs, and spraying concrete onto said backing member and around said studs and reinforcing bars until the concrete reaches such a thickness as to completely cover the edges of the studs remotely located from said backing member.

3. The method of making a reinforced building wall comprising the steps of, erecting a plurality of studs into upright horizontally spaced coplanar relation, securing a plurality of vertically spaced horizontally extending reinforcing bars to said studs along one side thereof, securing a substantially imperforate backing member along said reinforcing bars and in spaced relation to said studs, spraying concrete onto said backing member and around said studs and reinforcing bars until the concrete reaches such a thickness as to completely cover the edges of the studs remotely located from said backing member, applying a first layer of finish material to the exposed surface of said backing member, and applying a second layer of finish material to the exposed surface of said concrete.

References Cited

UNITED STATES PATENTS

| | | | |
|---|---|---|---|
| Re. 16,753 | 10/1927 | Nelson et al. | 52—448 |
| 927,050 | 7/1909 | Jeffers | 52—354 |
| 1,073,134 | 9/1913 | Jester | 52—357 |
| 1,210,849 | 1/1917 | Scammell | 52—454 |
| 1,211,562 | 1/1917 | Edwards | 52—241 |
| 1,239,074 | 9/1917 | Bagnall et al. | 52—408 |
| 1,421,145 | 6/1922 | Banks | 52—383 |
| 1,510,224 | 9/1924 | Hicks | 52—348 |
| 1,755,503 | 4/1930 | Collins | 52—354 |
| 1,841,581 | 6/1932 | Garrett | 25—131 |
| 1,841,586 | 6/1932 | Garrett | 25—131 |
| 1,941,211 | 12/1933 | Inglee | 52—340 |
| 1,995,173 | 3/1935 | Ehle et al. | 52 |
| 2,020,908 | 11/1935 | Scammell | 52—454 |
| 2,161,185 | 6/1939 | Mills | 52—250 |
| 2,357,637 | 9/1944 | Drypolcher | 85 |
| 3,025,650 | 3/1962 | Nelsson | 52—357 |
| 3,199,827 | 8/1965 | Terry | 52—251 |

FOREIGN PATENTS

| | | |
|---|---|---|
| 102,037 | 9/1936 | Australia. |
| 563,990 | 9/1944 | Great Britain. |

FRANK L. ABBOTT, *Primary Examiner.*

JAMES L. RIDGILL, *Assistant Examiner.*